US012666400B2

(12) United States Patent
Bontu et al.

(10) Patent No.: US 12,666,400 B2
(45) Date of Patent: Jun. 23, 2026

(54) RESOURCE ALLOCATION IN CELLULAR SYSTEMS

(71) Applicant: Telefonaktiebolaget LM Ericsson (publ), Stockholm (SE)

(72) Inventors: Chandra S. Bontu, Nepean (CA); Peter Hazy, Ottawa (CA); Jefferson Tokurah, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 521 days.

(21) Appl. No.: 18/000,985

(22) PCT Filed: Jun. 15, 2020

(86) PCT No.: PCT/IB2020/055585
§ 371 (c)(1),
(2) Date: Dec. 7, 2022

(87) PCT Pub. No.: WO2021/255493
PCT Pub. Date: Dec. 23, 2021

(65) Prior Publication Data
US 2023/0180189 A1     Jun. 8, 2023

(51) Int. Cl.
*H04W 72/02* (2009.01)
*H04W 72/044* (2023.01)
(Continued)

(52) U.S. Cl.
CPC ....... *H04W 72/02* (2013.01); *H04W 72/0446* (2013.01); *H04W 72/0473* (2013.01); *H04W 72/563* (2023.01)

(58) Field of Classification Search
CPC ............. H04W 72/02; H04W 72/0446; H04W 72/0473; H04W 72/563; H04W 72/569; H04W 72/121; H04W 72/56
See application file for complete search history.

(56) References Cited

U.S. PATENT DOCUMENTS 10,187,825 B2     1/2019   Luo et al.
2007/0223422 A1*  9/2007   Kim ..................... H04B 7/0632
                                                              370/334
(Continued)

FOREIGN PATENT DOCUMENTS

EP        3 432 504 A1    1/2019
EP        3 439 218 A1    2/2019
(Continued)

OTHER PUBLICATIONS

International Search Report and Written Opinion dated Mar. 2, 2021 issued in PCT Application No. PCT/IB2020/055585, consisting of 17 pages.
(Continued)

*Primary Examiner* — Ayman A Abaza
*Assistant Examiner* — Alyssa Williams
(74) *Attorney, Agent, or Firm* — Sonoda & Kobayashi Intellectual Property Law; Darren M. Gardner

(57)     ABSTRACT

Apparatuses and methods for resource allocation are disclosed. In one embodiment, a method implemented in a network node includes selecting an available resource in a transmission time interval, TTI; determining at least one set of dedicated radio bearers, DRBs, that can be co-scheduled in the selected resource; and allocating the selected resource to at least a subset of the determined at least one set of DRBs. In another embodiment, a network node is configured to select an available resource in a transmission time interval, TTI; determine at least one set of dedicated radio bearer, DRBs, that can be co-scheduled in the selected resource; and allocate the selected resource to at least a subset of the determined at least one set of DRBs.

15 Claims, 11 Drawing Sheets

(51) Int. Cl.
*H04W 72/0446*  (2023.01)
*H04W 72/563*   (2023.01)

(56)     References Cited

U.S. PATENT DOCUMENTS

| | | | | |
|---|---|---|---|---|
| 2010/0246705 A1* | 9/2010 | Shin | .................. | H04W 72/0473 |
| | | | | 375/267 |
| 2011/0183678 A1* | 7/2011 | Kerpez | ................. | H04W 24/06 |
| | | | | 455/450 |
| 2011/0216659 A1* | 9/2011 | Sampath | ............. | H04W 72/121 |
| | | | | 370/329 |
| 2018/0014221 A1* | 1/2018 | Rastogi | ............... | H04W 72/566 |
| 2018/0049206 A1* | 2/2018 | Yerramalli | ............ | H04W 16/14 |
| 2018/0279358 A1* | 9/2018 | Babaei | .............. | H04W 72/0453 |
| 2018/0352561 A1 | 12/2018 | Barabell et al. | | |
| 2019/0289534 A1* | 9/2019 | Ryoo | ................... | H04W 48/18 |
| 2022/0167355 A1* | 5/2022 | Andrews | ................. | H04L 47/80 |
| 2023/0362946 A1* | 11/2023 | Adjakple | ............. | H04W 72/54 |

FOREIGN PATENT DOCUMENTS

| | | | | |
|---|---|---|---|---|
| WO | WO-2018075828 A1 * | 4/2018 | ....... | H04L 27/26025 |
| WO | 2019/201421 A1 | 10/2019 | | |
| WO | 2020/063723 A1 | 4/2020 | | |
| WO | 2020/194210 A1 | 10/2020 | | |

OTHER PUBLICATIONS

Chandra S. Bontu, et al., Optimum Resource Allocation in MU-MIMO OFDMA Wireless Systems; IEEE VTC, 2020, consisting of 5 pages.

* cited by examiner

Network Node 16

SW 40

HW 27

Communication interface 28

Radio interface 30

Processing circuitry 34

Memory 38

Processor 36

Determination Unit 24

Allocation Unit 26

UE 22

SW 52

Client application 54

HW 42

Radio interface 44

Processing circuitry 46

Memory 50

Processor 48

32

BEGIN

Select an available resource in a transmission time interval, TTI
S100

Determine at least one set of dedicated radio bearers, DRBs, that can be co-scheduled in the selected resource
S102

Allocate the selected resource to at least a subset of the determined at least one set of DRBs
S104

END

X -Not scheduled since another RB of the same UE has been scheduled

⌐ -Request fulfilled

↙ -Head of the queue or primary UE request

RESOURCE ALLOCATION IN CELLULAR SYSTEMS

CROSS-REFERENCE TO RELATED APPLICATIONS

This application is a Submission Under 35 U.S.C. § 371 for U.S. National Stage Patent Application of International Application Number: PCT/IB2020/055585, filed Jun. 15, 2020 entitled "RESOURCE ALLOCATION IN CELLULAR SYSTEMS," the entirety of which is incorporated herein by reference.

TECHNICAL FIELD

The present disclosure relates to wireless communication and in particular, resource allocation in cellular systems.

BACKGROUND

Resource allocation in cellular systems may ensure proper use of valuable radio resources to maximize the cell throughput, capacity and user throughput and fairness. For example, as shown FIG. 1, a server, i.e., a resource allocator, serves each user equipment (UE) request as the UE requests arrive with the available resources until either all the resources are exhausted, or there are no more UE requests. A request may be associated with each radio bearer (RB), either signaling or data bearer, initiated by the UE on uplink (UL) or downlink (DL). A request may also be associated with a broadcast message set up on the network on the DL.

Arrangements to more efficiently allocate resources are needed.

SUMMARY

Some embodiments advantageously provide a method and system for more efficient resource allocation in cellular systems.

According to one aspect of the present disclosure, a method implemented in a network node is provided. The method includes selecting an available resource in a transmission time interval, TTI; determining at least one set of dedicated radio bearers, DRBs, that can be co-scheduled in the selected resource; and allocating the selected resource to at least a subset of the determined at least one set of DRBs.

In some embodiments of this aspect, allocating the selected resource to the at least the subset of the at least one set of DRBs includes selecting a highest priority DRB having data to transmit in the TTI; and allocating at least a first part of the selected resource to the highest priority DRB. In some embodiments of this aspect, allocating the selected resource to the at least the subset of the at least one set of DRBs includes selecting a highest priority DRB having data to transmit in the TTI; determining at least one set of dedicated radio bearers, DRBs, that can be co-scheduled with the highest priority DRB; partitioning the resource among the highest priority DRB and at least one DRB of the at least one set of DRBs that can be co-scheduled with the highest priority DRB; and allocating at least a first part of the selected resource to the highest priority DRB.

In some embodiments of this aspect, the partitioning the resource among the highest priority DRB and the at least one DRB of the at least one set of DRBs includes dividing an available transmit power for the resource among the highest priority DRB and the at least one DRB of the set of DRBs. In some embodiments of this aspect, the partitioning the resource among the highest priority DRB and the at least one DRB of the at least one set of DRBs includes dividing at least one of time, frequency and power reserved for the resource among the highest priority DRB and the at least one DRB of the at least one set of DRBs.

In some embodiments of this aspect, the dividing the available transmit power for the resource among the highest priority DRB and the at least one DRB of the at least one set of DRBs includes computing a total number of transmission layers scheduled on the selected resource; and allocating equal transmit power per each transmission layer that is scheduled to be transmitted over the resource. In some embodiments of this aspect, the dividing the available transmit power for the resource among the highest priority DRB and the at least one DRB of the at least one set of DRBs includes computing a total number of transmission layers scheduled on the selected resource; and computing a transmit power share per each transmission layer that is scheduled to be transmitted over the resource according to the transmission layer's user priority.

In some embodiments of this aspect, determining the at least one set of DRBs that can be co-scheduled in the selected resource includes determining the at least one set of DRBs that can be co-scheduled with the highest priority DRB in the TTI; and allocating the selected resource to the at least the subset of the at least one set of DRBs includes allocating at least a second part of the selected resource to at least one DRB in the at least the subset of DRBs that can be co-scheduled with the highest priority DRB in the TTI. In some embodiments of this aspect, selecting the highest priority DRB having data to transmit in the TTI includes sorting a plurality of DRBs that have data in a buffer for the TTI in a queue of DRBs according to a priority order; and selecting the highest priority DRB in the queue.

In some embodiments of this aspect, selecting the available resource in the TTI includes selecting the available resource in the TTI for allocation to the highest priority DRB. In some embodiments of this aspect, selecting the available resource in the TTI for the highest priority DRB includes identifying an available resource having a highest channel quality out of a plurality of available resources for allocation to the highest priority DRB. In some embodiments of this aspect, determining the at least one set of DRBs that can be co-scheduled with the highest priority DRB in the TTI includes identifying a plurality of DRBs having data to transmit in the TTI; and evaluating a sum utility metric among the identified plurality of DRBs and the highest priority DRB.

In some embodiments of this aspect, allocating the selected resource to the at least the subset of the at least one set of DRBs and the highest priority DRB includes selecting the at least the subset of the at least one set of DRBs based on a maximum sum utility; and allocating the selected resource to all DRBs in the selected at least the subset and the highest priority DRB. In some embodiments of this aspect, determining the at least one set of dedicated radio bearers, DRBs, that can be co-scheduled in the selected resource further includes grouping a plurality of DRBs that have data in a buffer for the TTI into multi-user multiple-input multiple-output, MU-MIMO, groups based at least in part on a spatial separation of user equipments, UEs, associated with each DRB of the plurality of DRBs.

In some embodiments of this aspect, the method further includes if the allocation of the selected highest priority DRB is fulfilled in the TTI, selecting a next highest priority DRB having data to transmit in the TTI; and allocating at least a third part of the selected resource to the next highest priority DRB. In some embodiments of this aspect, the method further includes as a result of selecting the next highest priority DRB, determining a set of DRBs that can be co-scheduled with the next highest priority DRB in the TTI; and allocating the at least the third part of the selected resource to the next highest priority DRB and at least a subset of the determined set of DRBs that can be co-scheduled with the next highest priority DRB in the TTI. In some embodiments of this aspect, the method further includes discontinuing allocating the selected resource to the at least one set of DRBs that can be co-scheduled with the highest priority DRB that is fulfilled in the TTI.

According to another aspect of the present disclosure, a network node including processing circuitry is provided. The processing circuitry is configured to select an available resource in a transmission time interval, TTI; determine at least one set of dedicated radio bearers, DRBs, that can be co-scheduled in the selected resource; and allocate the selected resource to at least a subset of the determined at least one set of DRBs.

In some embodiments of this aspect, the processing circuitry is configured to allocate the selected resource to the at least the subset of the at least one set of DRBs by being configured to select a highest priority DRB having data to transmit in the TTI; and allocate at least a first part of the selected resource to the highest priority DRB. In some embodiments of this aspect, the processing circuitry is configured to allocate the selected resource to the at least the subset of the at least one set of DRBs by being configured to select a highest priority DRB having data to transmit in the TTI; determine at least one set of dedicated radio bearers, DRBs, that can be co-scheduled with the highest priority DRB; partition the resource among the highest priority DRB and at least one DRB of the at least one set of DRBs that can be co-scheduled with the highest priority DRB; and allocate at least a first part of the selected resource to the highest priority DRB.

In some embodiments of this aspect, the processing circuitry is configured to partition the resource among the highest priority DRB and the at least one DRB of the at least one set of DRBs by being configured to divide an available transmit power for the resource among the highest priority DRB and the at least one DRB of the set of DRBs. In some embodiments of this aspect, the processing circuitry is configured to partition the resource among the highest priority DRB and the at least one DRB of the at least one set of DRBs by being configured to divide at least one of time, frequency and power reserved for the resource among the highest priority DRB and the at least one DRB of the at least one set of DRBs. In some embodiments of this aspect, the processing circuitry is configured to divide the available transmit power for the resource among the highest priority DRB and the at least one DRB of the at least one set of DRBs by being configured to compute a total number of transmission layers scheduled on the selected resource; and allocate equal transmit power per each transmission layer that is scheduled to be transmitted over the resource.

In some embodiments of this aspect, the processing circuitry is configured to divide the available transmit power for the resource among the highest priority DRB and the at least one DRB of the at least one set of DRBs by being configured to compute a total number of transmission layers scheduled on the selected resource; and compute a transmit power share per each transmission layer that is scheduled to be transmitted over the resource according to the transmission layer's user priority. In some embodiments of this aspect, the processing circuitry is configured to determine the at least one set of DRBs that can be co-scheduled in the selected resource by being configured to determine the at least one set of DRBs that can be co-scheduled with the highest priority DRB in the TTI; and allocate the selected resource to the at least the subset of the at least one set of DRBs by being configured to allocate at least a second part of the selected resource to at least one DRB in the at least the subset of DRBs that can be co-scheduled with the highest priority DRB in the TTI.

In some embodiments of this aspect, the processing circuitry is configured to select the highest priority DRB having data to transmit in the TTI by being configured to sort a plurality of DRBs that have data in a buffer for the TTI in a queue of DRBs according to a priority order; and select the highest priority DRB in the queue. In some embodiments of this aspect, the processing circuitry is configured to select the available resource in the TTI by being configured to select the available resource in the TTI for allocation to the highest priority DRB. In some embodiments of this aspect, the processing circuitry is configured to select the available resource in the TTI for the highest priority DRB by being configured to identify an available resource having a highest channel quality out of a plurality of available resources for allocation to the highest priority DRB.

In some embodiments of this aspect, the processing circuitry is configured to determine the at least one set of DRBs that can be co-scheduled with the highest priority DRB in the TTI by being configured to identify a plurality of DRBs having data to transmit in the TTI; and evaluate a sum utility metric among the identified plurality of DRBs and the highest priority DRB. In some embodiments of this aspect, the processing circuitry is configured to allocate the selected resource to the at least the subset of the at least one set of DRBs and the highest priority DRB by being configured to select the at least the subset of the at least one set of DRBs based on a maximum sum utility; and allocate the selected resource to all DRBs in the selected at least the subset and the highest priority DRB.

In some embodiments of this aspect, the processing circuitry is configured to determine the at least one set of dedicated radio bearers, DRBs, that can be co-scheduled in the selected resource by being further configured to group a plurality of DRBs that have data in a buffer for the TTI into multi-user multiple-input multiple-output, MU-MIMO, groups based at least in part on a spatial separation of user equipments, UEs, associated with each DRB of the plurality of DRBs. In some embodiments of this aspect, the processing circuitry is further configured to if the allocation of the selected highest priority DRB is fulfilled in the TTI, select a next highest priority DRB having data to transmit in the TTI; and allocate at least a third part of the selected resource to the next highest priority DRB.

In some embodiments of this aspect, the processing circuitry is further configured to as a result of selecting the next highest priority DRB, determine a set of DRBs that can be co-scheduled with the next highest priority DRB in the TTI; and allocate the at least the third part of the selected resource to the next highest priority DRB and at least a subset of the determined set of DRBs that can be co-scheduled with the next highest priority DRB in the TTI. In some embodiments of this aspect, the processing circuitry is further configured to discontinue allocating the selected resource to the at least one set of DRBs that can be co-scheduled with the highest priority DRB that is fulfilled in the TTI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
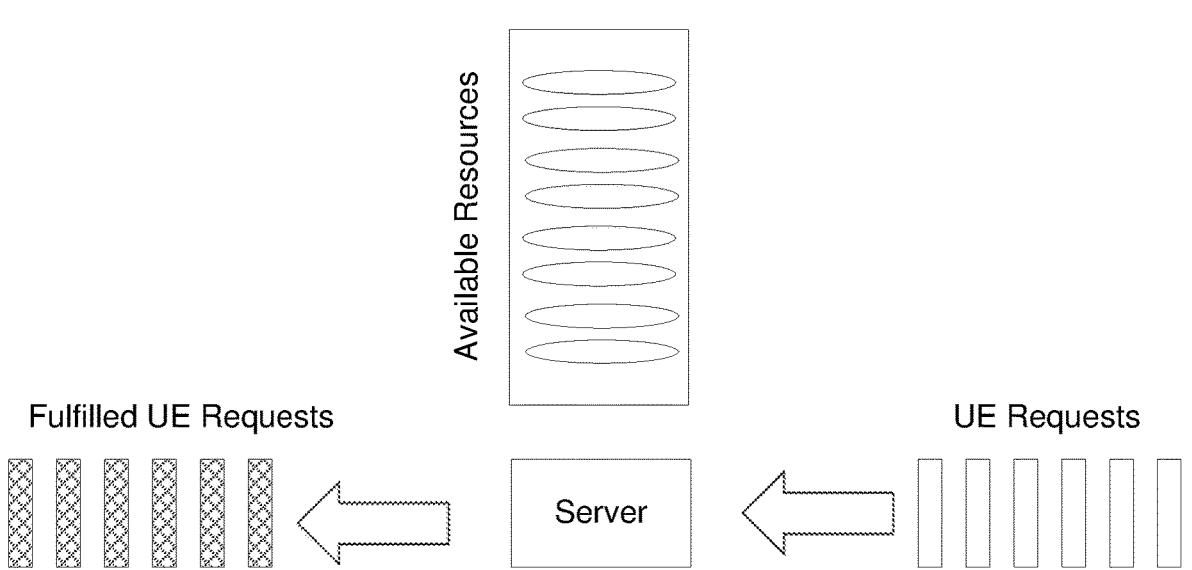
FIG. 1 is a schematic diagram of an example of resource allocation in a cellular system.

In the case of multi-user (MU)-MIMO, multiple user/service requests may be allocated to the same resource. The server/resource allocator depicted in FIG. 1, allocates resources to each UE request until each request is fulfilled. However, for a MU-MIMO resource allocator to be efficient in utilizing the available resources, the server should know a priori whether a resource can be shared with, or reused for another request, so that e.g., part of the resource may be reserved for the requests waiting in the queue.

Some embodiments propose methods of resource allocation in which UE requests are allocated to available resources (as opposed to resources allocated to UE requests. Some embodiments may advantageously enable proper sharing of resources, available transmit power, etc. among the UE requests, as described in more detail herein below.

Before describing in detail example embodiments, it is noted that the embodiments reside primarily in combinations of apparatus components and processing steps related to resource allocation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment (UE) such as a wireless device (WD) or a radio network node.

In some embodiments, the non-limiting terms wireless device (WD) or a user equipment (UE) are used interchangeably. The UE herein can be any type of wireless device capable of communicating with a network node or another UE over radio signals, such as wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "allocation" may be considered to refer to one or more UEs being allocated one or more resources for a transmission, such as, for example, allocating a radio resource for one or more dedicated radio bearers (DRBs). In some embodiments, a network node may allocate resources by scheduling a UE and, for example, configuring the UE with the allocated resources via e.g., radio resource control (RRC) signaling in a higher layer and/or by signaling an indication of the allocated resources in a physical layer via e.g., a grant in downlink control information (DCI).

In some embodiments, the term "radio resource" is intended to indicate a frequency resource and/or a time resource. The time resource may correspond to any type of physical resource or radio resource expressed in terms of length of time. Examples of time resources are: symbol, time slot, subframe, radio frame, transmission time interval (TTI), interleaving time, etc. The frequency resource may correspond to one or more resource elements, subcarriers, resource blocks, bandwidth part and/or any other resources in the frequency domain. The radio resource may also indicate a combination of subcarriers, time slots, codes and/or spatial dimensions.

Even though the descriptions herein may be explained in the context of one of a Downlink (DL) and an Uplink (UL) communication, it should be understood that the basic principles disclosed may also be applicable to the other of the one of the DL and the UL communication. For DL communication, the network node is the transmitter and the receiver is the UE. For the UL communication, the transmitter is the UE and the receiver is the network node.

Although some of the examples herein may be explained in the context of one or more UEs being allocated radio resources in e.g., MU-MIMO, it should be understood that the principles may also be applicable to other types of radio communication.

In some embodiments, the allocated resource/radio resource may be allocated to UE requests and/or radio bearers. Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a network node may be distributed over a plurality of user equipments and/or network nodes. In other words, it is contemplated that the functions of the network node and user equipment described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for resource allocation in cellular systems.

Figure 2:
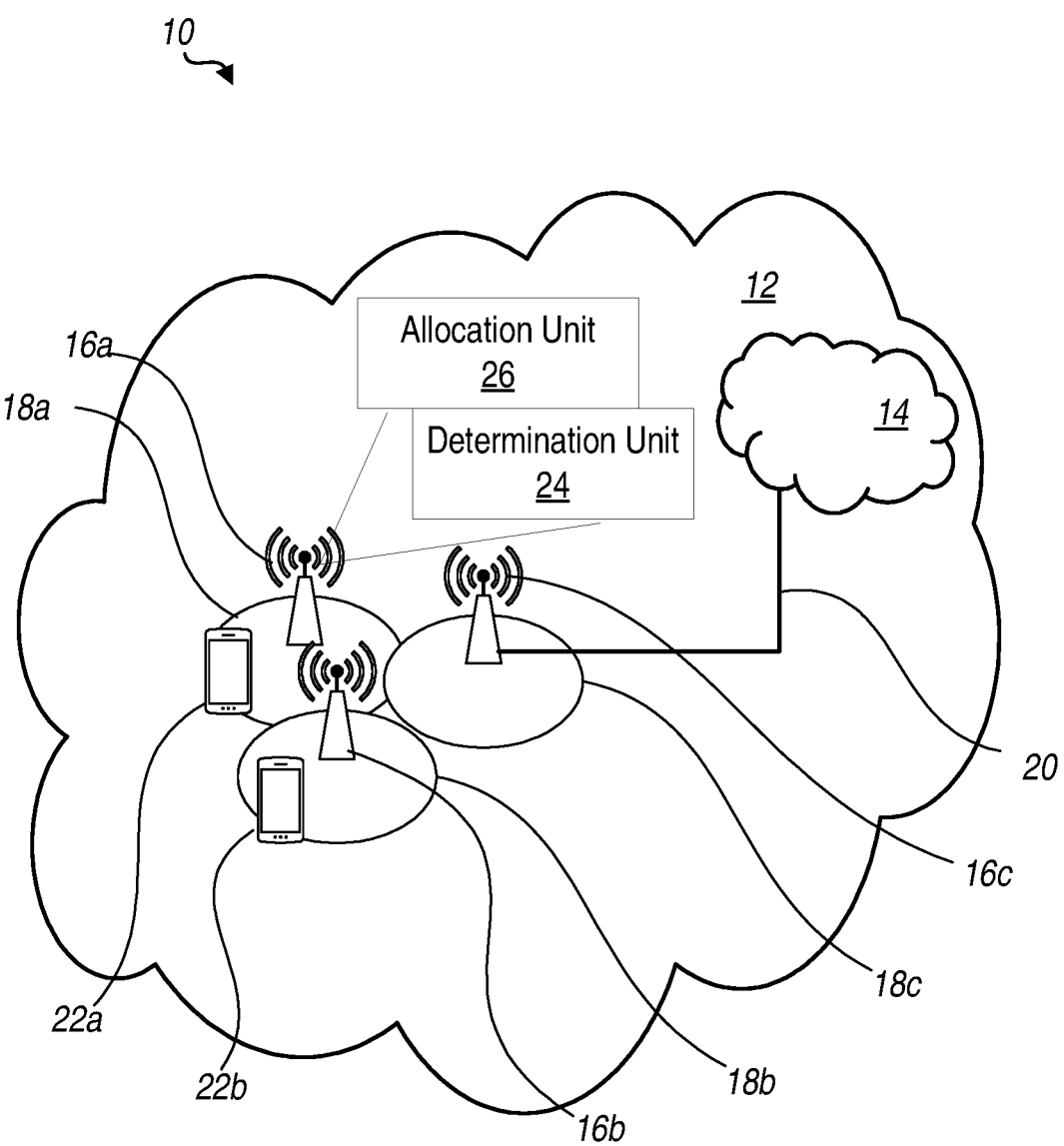
FIG. 2 is a schematic diagram of an example network architecture illustrating a communication system according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first user equipment (UE) 22a located in coverage area 18a is configured to wirelessly connect to, or be paged by, the corresponding network node 16a. A second UE 22b in coverage area 18*b* is wirelessly connectable to the corresponding network node 16*b*. While a plurality of UEs 22*a*, 22*b* (collectively referred to as user equipments 22) are illustrated in this example, the disclosed embodiments are equally applicable to a situation where a sole UE is in the coverage area or where a sole UE is connecting to the corresponding network node 16. Note that although only two UEs 22 and three network nodes 16 are shown for convenience, the communication system may include many more UEs 22 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN.

A network node 16 is configured to include a determination unit 24 which is configured to select an available resource in a transmission time interval, TTI; and determine at least one set of dedicated radio bearers, DRBs, that can be co-scheduled in the selected resource The network node 16 may further include an allocation unit 26 which is configured to allocate the selected resource to at least a subset of the determined at least one set of DRBs.

Example implementations, in accordance with an embodiment, of the UE 22 and network node 16 discussed in the preceding paragraphs will now be described with reference to FIG. 3.

The communication system 10 further includes a network node 16 provided in a communication system 10 and includes hardware 27 enabling the network node 16 to communicate with the UE 22. The hardware 27 may include a communication interface 28 for setting up and maintaining a wired or wireless connection with an interface of a different communication device of the communication system 10, as well as a radio interface 30 for setting up and maintaining at least a wireless connection 32 with a UE 22 located in a coverage area 18 served by the network node 16. The radio interface 30 may be formed as or may include, for example, one or more RF transmitters, one or more RF receivers, and/or one or more RF transceivers.

In the embodiment shown, the hardware 27 of the network node 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 40 stored internally in, for example, memory 38, or stored in external memory (e.g., database, storage array, network storage device, etc.) accessible by the network node 16 via an external connection. The software 40 may be executable by the processing circuitry 34. The processing circuitry 34 may be configured to control any of the methods and/or processes described herein and/or to cause such methods, and/or processes to be performed, e.g., by network node 16. Processor 36 corresponds to one or more processors 36 for performing network node 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to network node 16. For example, processing circuitry 34 of the network node 16 may include determination unit 24 and/or allocation unit 26 configured to perform network node methods discussed herein, such as the methods discussed with reference to FIG. 4 as well as other figures.

The communication system 10 further includes the UE 22 already referred to. The UE 22 may have hardware 42 that may include a radio interface 44 configured to set up and maintain a wireless connection 32 with a network node 16 serving a coverage area 18 in which the UE 22 is currently located. The radio interface 44 may be formed as or may include, for example, one or more RF transmitters, one or more RF receivers, and/or one or more RF transceivers.

The hardware 42 of the UE 22 further includes processing circuitry 46. The processing circuitry 46 may include a processor 48 and memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 52, which is stored in, for example, memory 50 at the UE 22, or stored in external memory (e.g., database, storage array, network storage device, etc.) accessible by the UE 22. The software 52 may be executable by the processing circuitry 46. The software 52 may include a client application 54. The client application 54 may be operable to provide a service to a human or non-human user via the UE 22. The client application 54 may interact with the user to generate the user data that it provides.

The processing circuitry 46 may be configured to control any of the methods and/or processes described herein and/or to cause such methods, and/or processes to be performed, e.g., by UE 22. The processor 48 corresponds to one or more processors 48 for performing UE 22 functions described herein. The UE 22 includes memory 50 that is configured to store data, programmatic software code and/or other information described herein. In some embodiments, the software 52 and/or the client application 54 may include instructions that, when executed by the processor 48 and/or processing circuitry 46, causes the processor 48 and/or processing circuitry 46 to perform the processes described herein with respect to UE 22. For example, the processing circuitry 46 of the user equipment 22 may be configured to use resources and/or receive and/or transmit on radio resources (e.g., physical layer resources, such as, on one or more MU- MIMO layers, etc.) that are allocated to the UE 22 using one or more of the techniques disclosed herein.

Figure 3:
FIG. 3 is a block diagram of a network node in communication with a wireless device over an at least partially wireless connection according to some embodiments of the present disclosure.

In some embodiments, the inner workings of the network node 16 and UE 22, may be as shown in FIG. 3 and independently, the surrounding network topology may be that of FIG. 2.

Although FIGS. 2 and 3 show various "units" such as determination unit 24 and allocation unit 26 as being within a processor, it is contemplated that these units may be implemented such that a portion of the unit is stored in a corresponding memory within the processing circuitry. In other words, the units may be implemented in hardware or in a combination of hardware and software within the processing circuitry.

In addition, although FIGS. 2 and 3 show both determination unit 24 and allocation unit 26 as being with the network node 16, it is contemplated that the network node 16 may include only one of these units.

Figure 4:
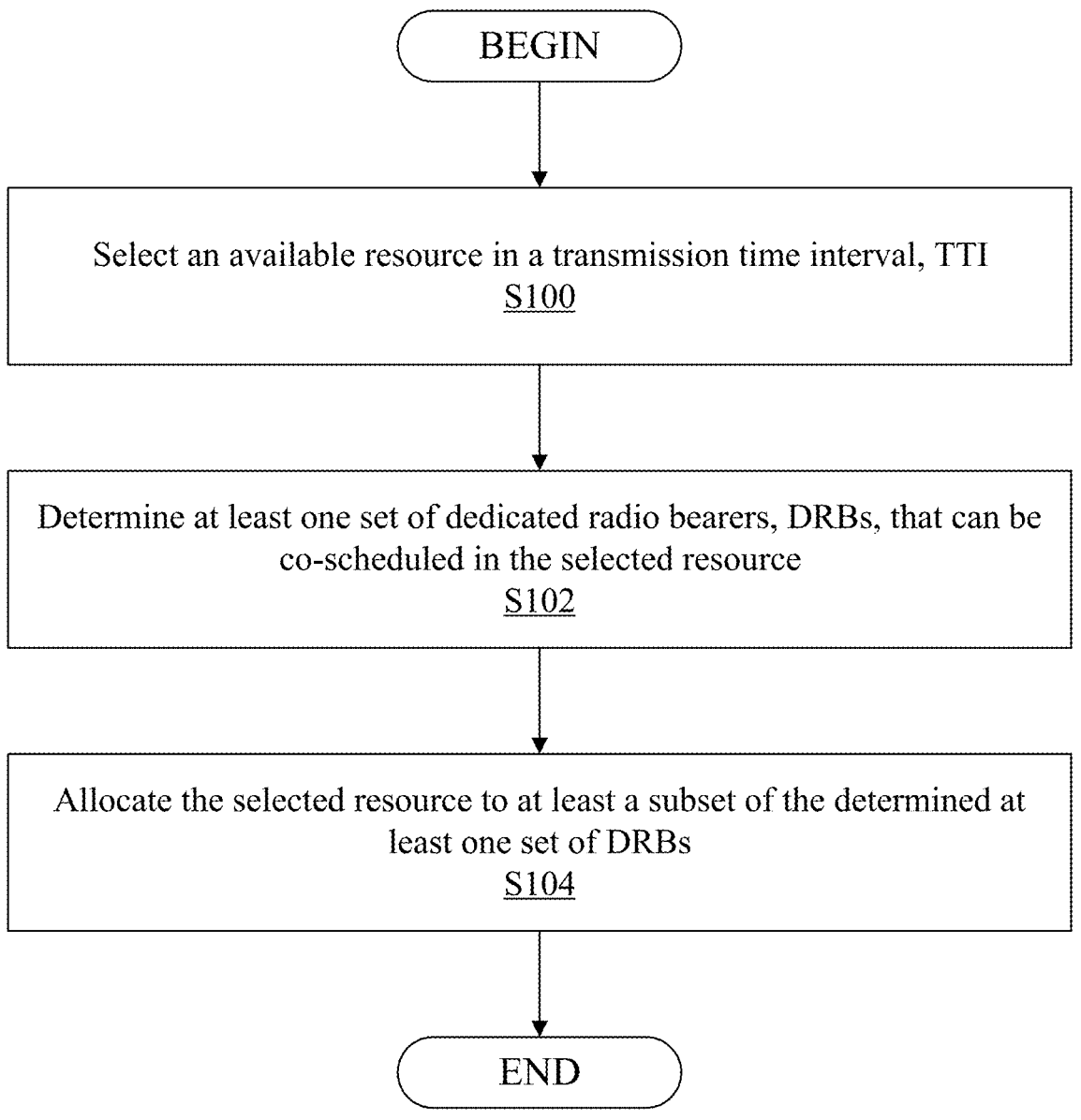
FIG. 4 is a flowchart of an example method for a network node for allocating resources according to one embodiment of the present disclosure.

FIG. 4 is a flowchart of an example process in a network node 16 for allocating resources using a dynamic decision threshold according to some embodiments of the present disclosure. One or more Blocks and/or functions and/or methods performed by the network node 16 may be performed by one or more elements of network node 16 such as by determination unit 24 and/or allocation unit 26 in processing circuitry 34, processor 36, communication interface 28, radio interface 30, etc. according to the example method. The example method includes selecting (Block S 100), such as via determination unit 24 and/or allocation unit 26, processing circuitry 34, processor 36, communication interface 28 and/or radio interface 30, an available resource in a transmission time interval, TTI. The method includes determining (Block S 102), such as via determination unit 24 and/or allocation unit 26, processing circuitry 34, processor 36, communication interface 28 and/or radio interface 30, at least one set of dedicated radio bearers, DRBs, that can be co-scheduled in the selected resource. The method includes allocating (Block S 104), such as via determination unit 24 and/or allocation unit 26, processing circuitry 34, processor 36, communication interface 28 and/or radio interface 30, the selected resource to at least a subset of the determined at least one set of DRBs.

In some embodiments, allocating the selected resource to the at least the subset of the at least one set of DRBs comprises selecting, such as via determination unit 24 and/or allocation unit 26, processing circuitry 34, processor 36, communication interface 28 and/or radio interface 30, a highest priority DRB having data to transmit in the TTI; and allocating, such as via determination unit 24 and/or allocation unit 26, processing circuitry 34, processor 36, communication interface 28 and/or radio interface 30, at least a first part of the selected resource to the highest priority DRB.

In some embodiments, allocating the selected resource to the at least the subset of the at least one set of DRBs includes selecting, such as via determination unit 24 and/or allocation unit 26, processing circuitry 34, processor 36, communication interface 28 and/or radio interface 30, a highest priority DRB having data to transmit in the TTI; determining, such as via determination unit 24 and/or allocation unit 26, processing circuitry 34, processor 36, communication interface 28 and/or radio interface 30, at least one set of dedicated radio bearers, DRBs, that can be co-scheduled with the highest priority DRB; partitioning, such as via determination unit 24 and/or allocation unit 26, processing circuitry 34, processor 36, communication interface 28 and/or radio interface 30, the resource among the highest priority DRB and at least one DRB of the at least one set of DRBs that can be co-scheduled with the highest priority DRB; and allocating, such as via determination unit 24 and/or allocation unit 26, processing circuitry 34, processor 36, communication interface 28 and/or radio interface 30, at least a first part of the selected resource to the highest priority DRB.

In some embodiments, the partitioning the resource among the highest priority DRB and the at least one DRB of the at least one set of DRBs comprises dividing, such as via determination unit 24 and/or allocation unit 26, processing circuitry 34, processor 36, communication interface 28 and/or radio interface 30, an available transmit power for the resource among the highest priority DRB and the at least one DRB of the set of DRBs. In some embodiments, the partitioning the resource among the highest priority DRB and the at least one DRB of the at least one set of DRBs comprises dividing, such as via determination unit 24 and/or allocation unit 26, processing circuitry 34, processor 36, communication interface 28 and/or radio interface 30, at least one of time, frequency and power reserved for the resource among the highest priority DRB and the at least one DRB of the at least one set of DRBs.

In some embodiments, the dividing the available transmit power for the resource among the highest priority DRB and the at least one DRB of the at least one set of DRBs comprises computing, such as via determination unit 24 and/or allocation unit 26, processing circuitry 34, processor 36, communication interface 28 and/or radio interface 30, a total number of transmission layers scheduled on the selected resource; and allocating, such as via determination unit 24 and/or allocation unit 26, processing circuitry 34, processor 36, communication interface 28 and/or radio interface 30, equal transmit power per each transmission layer that is scheduled to be transmitted over the resource.

In some embodiments, the dividing the available transmit power for the resource among the highest priority DRB and the at least one DRB of the at least one set of DRBs comprises computing, such as via determination unit 24 and/or allocation unit 26, processing circuitry 34, processor 36, communication interface 28 and/or radio interface 30, a total number of transmission layers scheduled on the selected resource; and computing, such as via determination unit 24 and/or allocation unit 26, processing circuitry 34, processor 36, communication interface 28 and/or radio interface 30, a transmit power share per each transmission layer that is scheduled to be transmitted over the resource according to the transmission layer's user priority.

In some embodiments, determining the at least one set of DRBs that can be co-scheduled in the selected resource comprises determining, such as via determination unit 24 and/or allocation unit 26, processing circuitry 34, processor 36, communication interface 28 and/or radio interface 30, the at least one set of DRBs that can be co-scheduled with the highest priority DRB in the TTI; and allocating, such as via determination unit 24 and/or allocation unit 26, processing circuitry 34, processor 36, communication interface 28 and/or radio interface 30, the selected resource to the at least the subset of the at least one set of DRBs comprises allocating, such as via determination unit 24 and/or allocation unit 26, processing circuitry 34, processor 36, communication interface 28 and/or radio interface 30, at least a second part of the selected resource to at least one DRB in the at least the subset of DRBs that can be co-scheduled with the highest priority DRB in the TTI.

In some embodiments, selecting the highest priority DRB having data to transmit in the TTI comprises sorting, such as via determination unit 24 and/or allocation unit 26, processing circuitry 34, processor 36, communication interface 28 and/or radio interface 30, a plurality of DRBs that have data in a buffer for the TTI in a queue of DRBs according to a priority order; and selecting, such as via determination unit 24 and/or allocation unit 26, processing circuitry 34, processor 36, communication interface 28 and/or radio interface 30, the highest priority DRB in the queue. In some embodiments, selecting the available resource in the TTI comprises selecting, such as via determination unit 24 and/or allocation unit 26, processing circuitry 34, processor 36, communication interface 28 and/or radio interface 30, the available resource in the TTI for allocation to the highest priority DRB.

In some embodiments, selecting the available resource in the TTI for the highest priority DRB comprises identifying, such as via determination unit 24 and/or allocation unit 26, processing circuitry 34, processor 36, communication interface 28 and/or radio interface 30, an available resource having a highest channel quality out of a plurality of available resources for allocation to the highest priority DRB. In some embodiments, determining the at least one set of DRBs that can be co-scheduled with the highest priority DRB in the TTI comprises identifying, such as via determination unit 24 and/or allocation unit 26, processing circuitry 34, processor 36, communication interface 28 and/or radio interface 30, a plurality of DRBs having data to transmit in the TTI; and evaluating, such as via determination unit 24 and/or allocation unit 26, processing circuitry 34, processor 36, communication interface 28 and/or radio interface 30, a sum utility metric among the identified plurality of DRBs and the highest priority DRB.

In some embodiments, allocating the selected resource to the at least the subset of the at least one set of DRBs and the highest priority DRB comprises selecting, such as via determination unit 24 and/or allocation unit 26, processing circuitry 34, processor 36, communication interface 28 and/or radio interface 30, the at least the subset of the at least one set of DRBs based on a maximum sum utility; and allocating, such as via determination unit 24 and/or allocation unit 26, processing circuitry 34, processor 36, communication interface 28 and/or radio interface 30, the selected resource to all DRBs in the selected at least the subset and the highest priority DRB.

In some embodiments, determining the at least one set of dedicated radio bearers, DRBs, that can be co-scheduled in the selected resource further comprises grouping, such as via determination unit 24 and/or allocation unit 26, processing circuitry 34, processor 36, communication interface 28 and/or radio interface 30, a plurality of DRBs that have data in a buffer for the TTI into multi-user multiple-input multiple-output, MU-MIMO, groups based at least in part on a spatial separation of user equipments, UEs, associated with each DRB of the plurality of DRBs. In some embodiments, the method further includes if the allocation of the selected highest priority DRB is fulfilled in the TTI, selecting, such as via determination unit 24 and/or allocation unit 26, processing circuitry 34, processor 36, communication interface 28 and/or radio interface 30, a next highest priority DRB having data to transmit in the TTI; and allocating, such as via determination unit 24 and/or allocation unit 26, processing circuitry 34, processor 36, communication interface 28 and/or radio interface 30, at least a third part of the selected resource to the next highest priority DRB.

In some embodiments, the method further includes, as a result of selecting the next highest priority DRB, determining, such as via determination unit 24 and/or allocation unit 26, processing circuitry 34, processor 36, communication interface 28 and/or radio interface 30, a set of DRBs that can be co-scheduled with the next highest priority DRB in the TTI; and allocating, such as via determination unit 24 and/or allocation unit 26, processing circuitry 34, processor 36, communication interface 28 and/or radio interface 30, the at least the third part of the selected resource to the next highest priority DRB and at least a subset of the determined set of DRBs that can be co-scheduled with the next highest priority DRB in the TTI.

In some embodiments, the method further includes discontinuing, such as via determination unit 24 and/or allocation unit 26, processing circuitry 34, processor 36, communication interface 28 and/or radio interface 30, allocating the selected resource to the at least one set of DRBs that can be co-scheduled with the highest priority DRB that is fulfilled in the TTI.

Having described the general process flow of arrangements of the disclosure and having provided examples of hardware and software arrangements for implementing the processes and functions of the disclosure, the sections below provide details and examples of arrangements for resource allocation, which may be implemented by the network node 16 and/or user equipment 22.

Figure 5:
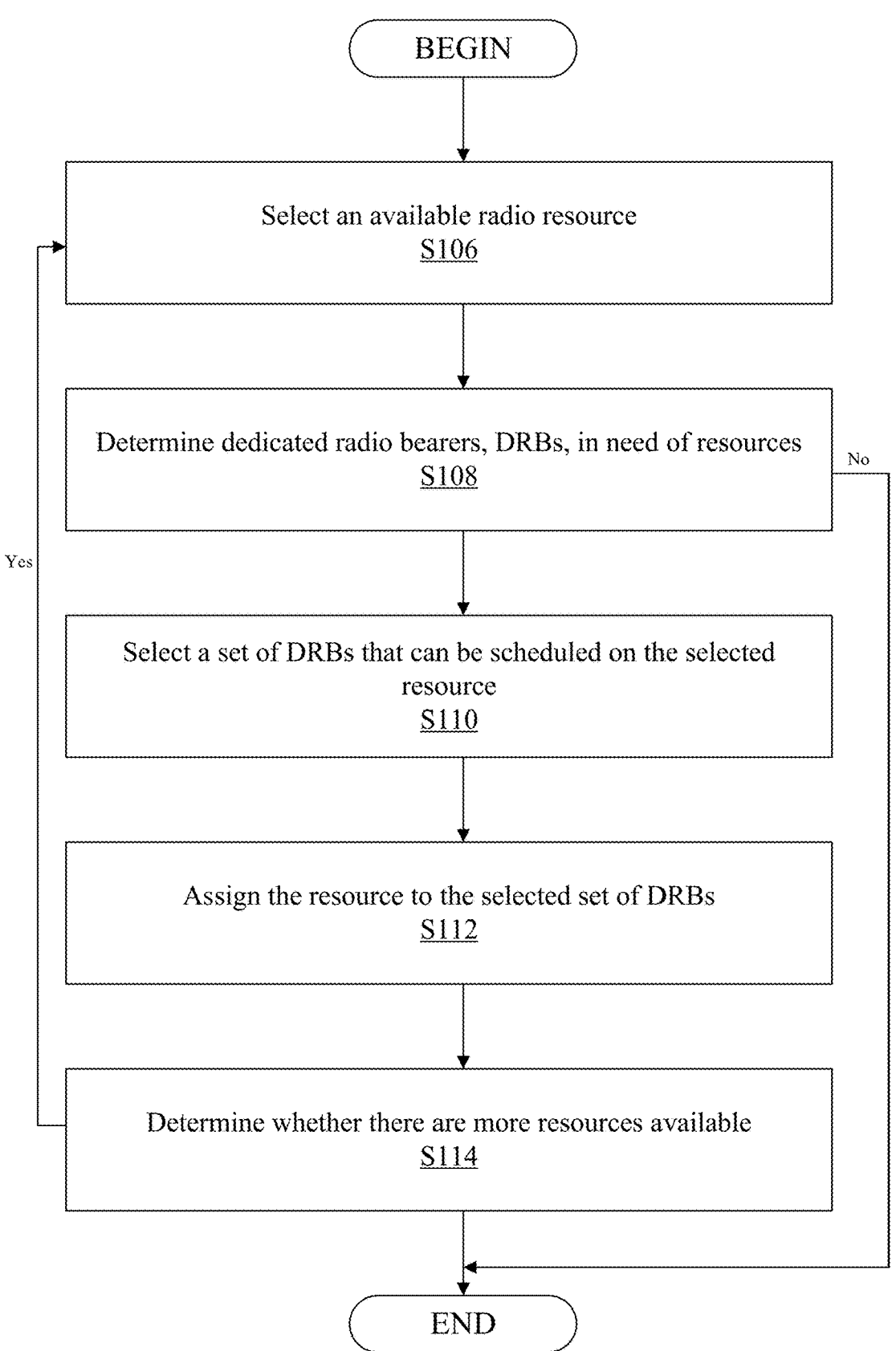
FIG. 5 is a flowchart of yet another example method for a network node for allocating resources according to another embodiment of the present disclosure.
Figure 6:
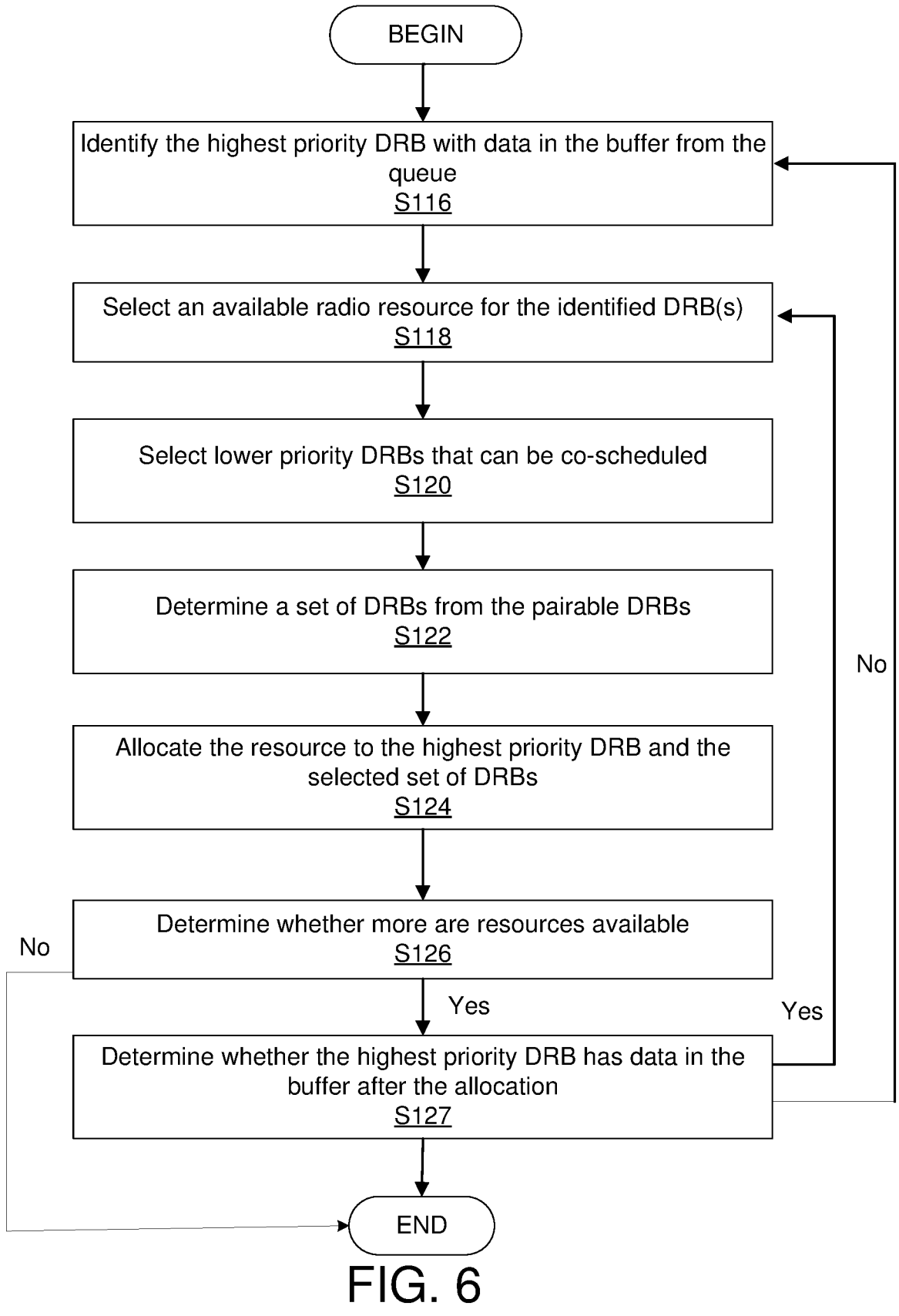
FIG. 6 is a flowchart illustrating yet another example method for allocating resources according to one embodiment of the present disclosure.

FIGS. 5 and 6 summarize some embodiments of the proposed method of resource allocation. As shown in FIG. 5, UE requests are allocated to available resources (as opposed to resources allocated to UE requests). This may enable proper sharing of resources, such as, transmit power, etc., among the UE requests. The example method includes, in step S106, selecting an available radio resource. In step S108, the method includes determining DRBs that need resources. If there are no DRBs in need of resources, the process may end. If there are DRBs in need of resources, the process includes, in step S110, selecting a set of DRBs that can be scheduled on the selected resource. In step S112, the method includes assigning the resource to the selected set of DRBs. In step S114, the method includes determining whether there are more resources available. If the answer is 'yes,' the process may return to step S106 and the process may repeat. If the answer is 'no,' the process may end.

FIG. 6 shows an example of the proposed mechanism, where UE request priorities are considered in allocating requests to resources. In step S116, the method includes identifying the highest priority DRB with data in the buffer from the queue. In step S118, the method includes selecting an available radio resource for the identified DRB. In step S120, the method includes selecting lower priority DRBs that can co-scheduled with the identified highest priority DRB on the selected radio resource. In step S122, the method includes determining a set of DRBs from the pairable DRBs, i.e., the selected lower priority DRBs. In step S124, the method includes allocating the resource to the highest priority DRB and the selected set of DRBs. In step S126, the method includes determining whether more resources are available. If there are no more resources available, the process may end. If there are more resources available, the process may proceed to step S127, and determine whether the highest priority DRB has data in the buffer after the allocation. If the highest priority DRB does not have data in the buffer after the allocation (i.e., the request is fulfilled), the process may return to step S116, where the next, highest priority DRB with data in the buffer is identified from the queue and the process may repeat. If there are more resources available and the highest priority DRB does have data in the buffer after the allocation (i.e., the request is not yet fulfilled), the process may proceed to step S118, where a next, available radio resource is selected and the process may repeat.

Figure 7:
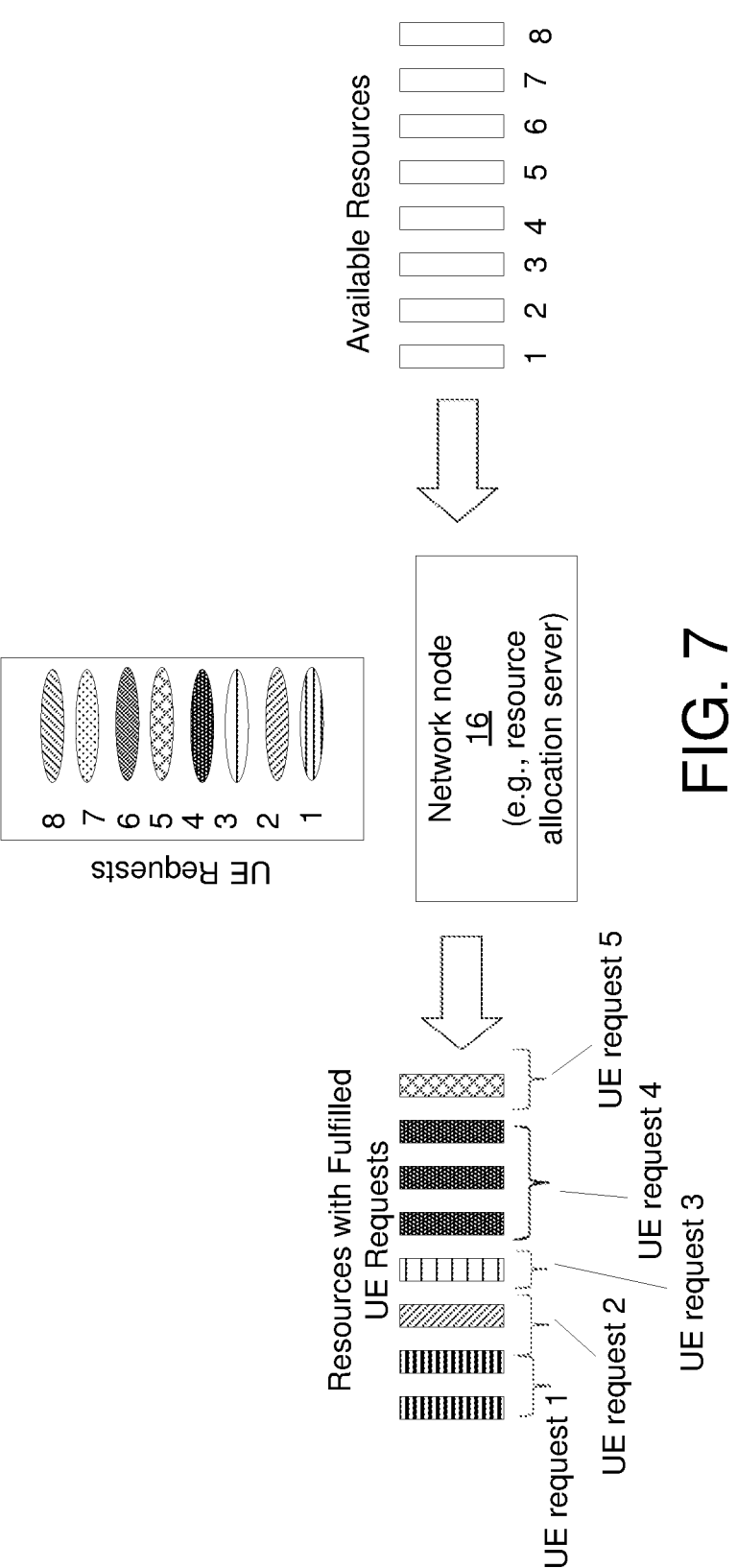
FIG. 7. is a schematic diagram of an example resource allocation strategy according to an embodiment of the present disclosure.

FIG. 7 is a schematic diagram depicting an example of a proposed resource allocation arrangement. According to one embodiment of the proposed arrangement, the resources are served with the UE requests (e.g., DRBs), until all the resources are exhausted, or all the requests are fulfilled. As shown in the depicted example, the network node 16 (e.g., resource allocation server) identifies each available resource and determines the appropriate UE request(s) that can be served by the resource. In one embodiment, an appropriate UE request may be selected, for example, based on the UE request's priority in the queue. In the example, shown in FIG. 7, the first two available resources (resources 1 and 2) are allocated to the highest priority request (UE request 1) to empty the UE's 22 buffer. The UE requests are organized in a queue, with UE request 1 being the highest priority request and UE request 8 being the lowest priority request currently in the queue. The next resource (resource 3) is assigned to the second highest priority request (UE request 2) and so on, until all the resources are exhausted, or all the UE requests are fulfilled. Based on the network node's 16 allocation decision, the resources allocated to a particular UE's 22 request may be provided to the UE 22 via control signaling, e.g., a physical downlink control channel (PDCCH). UE requests, that are not served in the current TTI may be prioritized during subsequent TTIs.

In some embodiments, when appropriate UEs 22 are selected for each available resource, the UE requests may be selected in their order of priority in the request queue. This may be performed to reduce control signaling overhead, e.g., the resources may be used such that the high priority UE requests are fulfilled and further control signaling may not be required in the subsequent TTIs to reallocate resources to the same UE requests.

Alternatively, in some embodiments, appropriate UEs 22 are selected for a given resource based on the UE's 22 channel quality on the resource.

Figure 8:
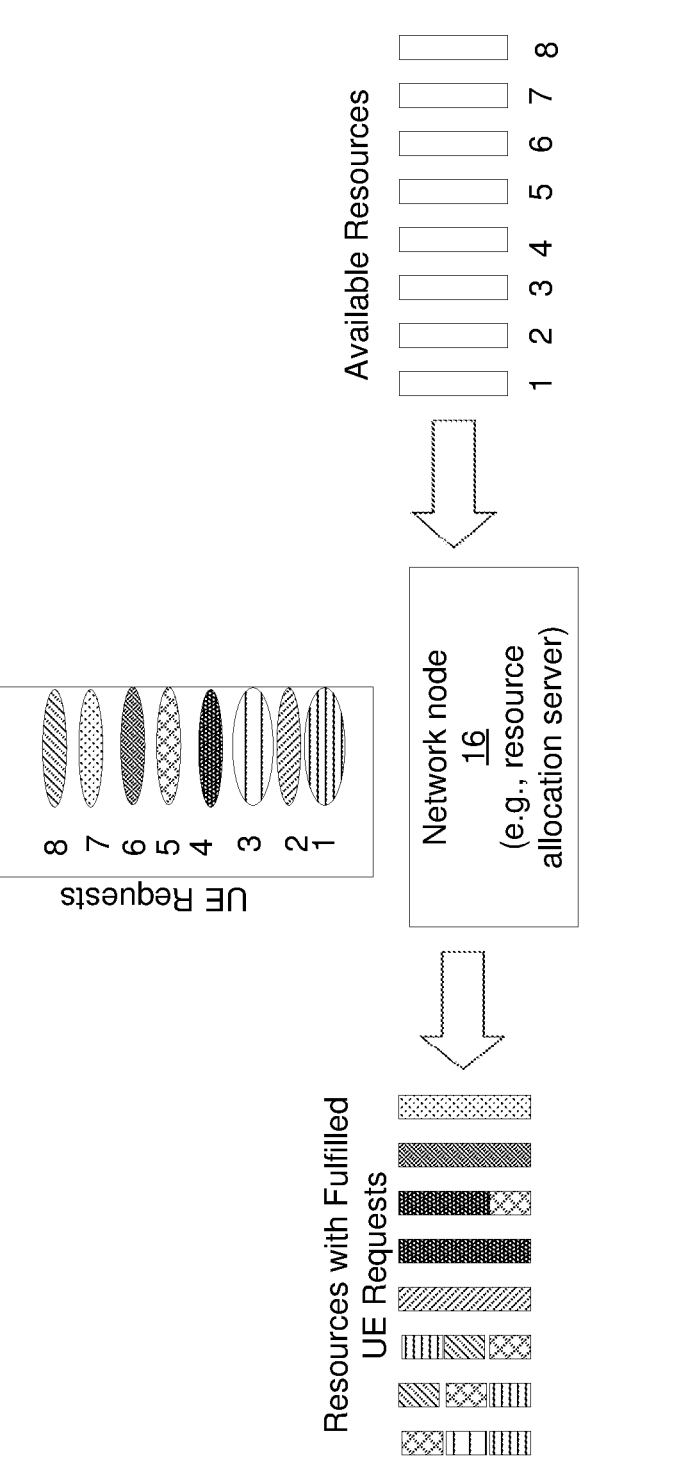
FIG. 8 is a schematic diagram of yet another example resource allocation strategy according to another embodiment of the present disclosure.

FIG. 8 is a schematic diagram illustrating yet another embodiment of a resource allocation mechanism where each available resource is assigned to an appropriate set of UE requests. In the example, the resource is shared among different UE requests (e.g., DRBs) based on, for example, the UE request's priority in the queue and/or UE request's need. Alternatively, in some embodiments, each available resource is co-allocated/co-scheduled to an appropriate set of UE requests based on the UE's 22 channel quality for the resource.

In the example shown in FIG. 8, for illustrative purposes, it may be assumed that the UE requests 1, 3, 5 and 8 can share resources. In some embodiments, whether the UE requests can share a resource or not may depend on the transmission channel conditions of the corresponding UEs 22 associated with the UE requests, for example, when the UEs 22 are sufficiently spatially separated and/or their respective channels are mutually orthogonal. Resources 1, 2 and 3 are shared among UE requests 1, 3, 5 and 8 until the UE request 1 (i.e., highest priority request in the queue) fulfilled its request. After the allocation of resource 1, UE 22 request 3 is fulfilled and does not have a resource-share in resources 2 and 3. Instead, UE request 8 shares the resources (resources 2 and 3) with UE requests 1 and 5 (e.g., since UE request 3 is already fulfilled in the resource 1 allocation). Based on the network node's 16 allocation decision, the resources allocated to a particular UE's 22 UE request may be informed to the UE 22 via e.g., PDCCH signaling (e.g., scheduling DCI).

In some embodiments, to avoid or at least reduce PDCCH capacity problems and fulfill user fairness, UE requests may be processed by the network node 16 based on the priority of the UE requests. In some embodiments, the priority of a radio bearer (RB), for example, may be computed from the RB's current channel/service quality or historical channel/service quality or both. The UE requests for a current TTI may be ordered according to the priority weights computed by the network node 16.

Figure 9:
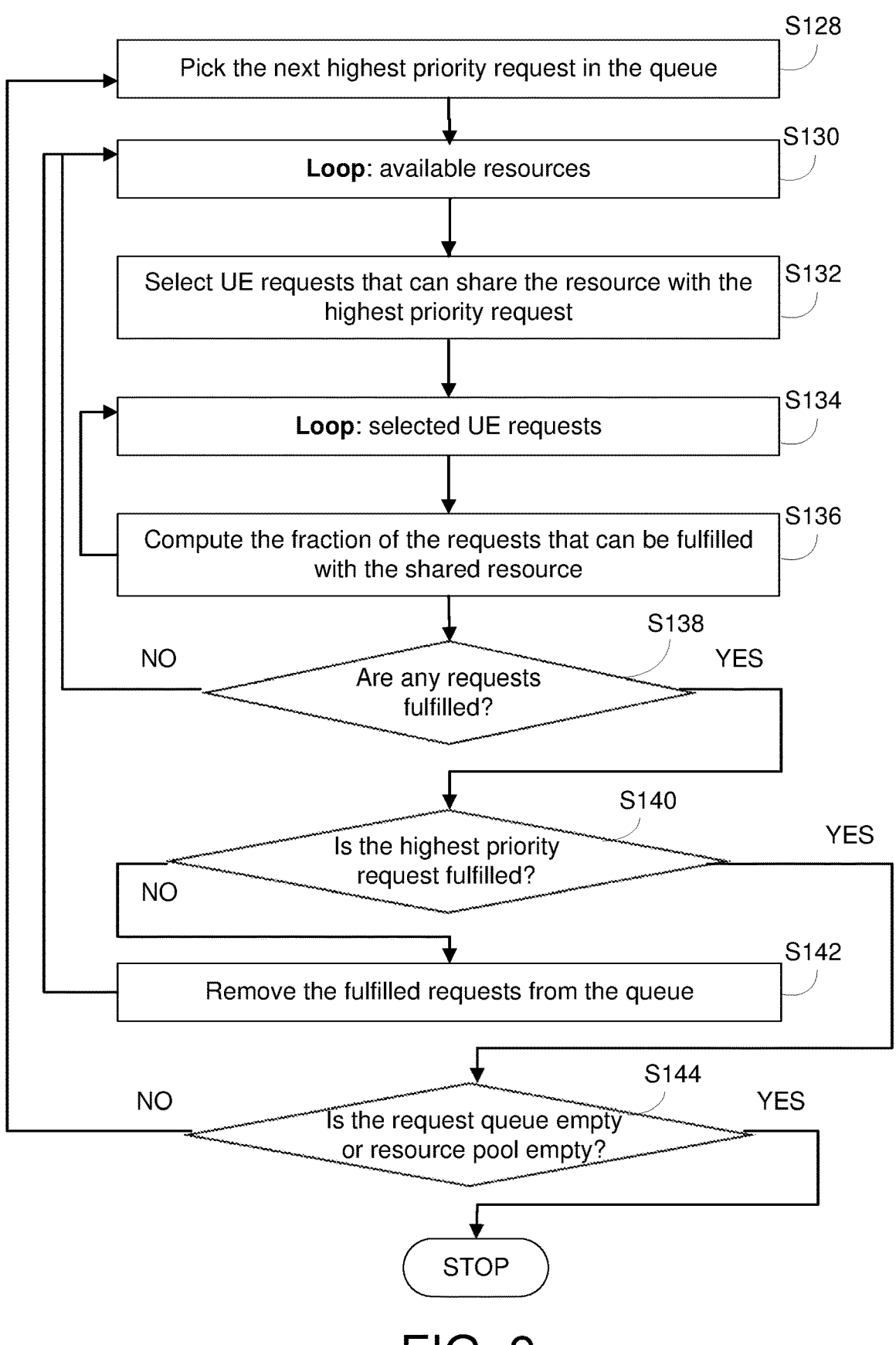
FIG. 9 is a flowchart illustrating an example process for allocating resources according to an embodiment of the present disclosure.

FIG. 9 shows a flowchart representing one example resource allocation arrangement, which may be performed by the network node 16, according to an embodiment of the present disclosure. As shown in FIG. 9, in step S128, a next highest priority UE request with data in the buffer, waiting in the queue may be selected as the "primary request" being served by the available resource. In step S130, an available resource may be determined. The available resources may be served in sequence. The order of the resources being served may be based on e.g., the channel quality of the "primary request". The first resource selected may be evaluated further for other potential UE requests that may share the resource with the "primary request". For example, in step S132, the network node 16 may select UE requests that can share the resource with the highest priority request in the queue. The selection of co-scheduled UE requests may be determined by the network node 16 based on, for example, the scheduled throughput on the selected resource. Alternatively, or additionally, in some embodiments, the selection of co-scheduled UE requests may be determined by the network node 16 based on e.g., maximizing a sum-utility on the selected resource. In one example, the utility may be defined as a ratio of expected user throughput if a resource is allocated to the user and average user throughput measured up until the time of evaluation. The expected throughput can be computed at the network using the channel state reported by the user or channel state measured the network node during the uplink reception from the user. In computing the ratio, the numerator and denominator may be modified by different parameters, $\alpha$ and $\beta$, ($0 \leq \alpha, \beta \leq 1$), as shown below. Utility function, for example, to evaluate the allocation decision of resource n can be expressed as follows.

$$\text{Utility } (n) = \frac{\text{expected user throughput} (u, n)^{\alpha}}{\text{average user throughout} (u, n-1)^{\beta}}$$

average throughput(u, n−1) is the average user throughput of user-u measured up until the allocation of a previous resource allocation.

$$\text{SumUtility } (n) = \sum_{u \in U} \frac{\text{expected user throughput} (u, n, U)^{\alpha}}{\text{average user throughput} (u, n-1)^{\beta}}$$

Where U represents the user set.

The expected user throughput(u, n, U) is the expected user throughput of user −u if the user were allocated resource-n, when the resource is shared among the user set U. The resource can be shared among the users in user set-U in many ways. The resource may be shared by splitting the transmit power allotted for the resource. In other examples, a resource can be shared by splitting the subcarriers, or OFDM symbols. In step S134, each of the selected UE requests may be evaluated by e.g., in step S136, computing the fraction of the requests that can be fulfilled with the shared resource. Steps S134 and S136 may be performed for each of the selected UE requests that can share the resource with the highest priority request. The selected UE requests may be co-allocated/co-scheduled on the selected resource and further evaluated for the fulfillment of the selected UE requests.

For example, in step S138, the network node 16 may determine whether there are any fulfilled UE requests among the co-scheduled requests. If the answer to step S138 is 'no' (i.e., no requests are fulfilled), the process returns to step S130, where a next available resource is identified to fulfill the UE requests. If the answer to step S138 is 'yes (i.e., if there are one or more fulfilled requests), the network node 16 may determine whether the highest priority request is fulfilled in step S140. If the answer to step S140 is 'no' (i.e., the highest priority request is not yet fulfilled), the process proceeds to step S142, where the fulfilled UE request(s) may be removed from the queue for subsequent allocations and the process returns to step S130, where a next available resource is identified to continue to fulfill the selected UE requests. If the answer to step S140 is 'yes' (i.e., the highest priority request has been fulfilled), the process proceeds to step S144, where the network node 16 determines whether the request queue/priority queue is empty or the resource pool is empty. If the answer to step S144 is 'no' (i.e., if the resource pool is not empty and the request queue is not empty, meaning more resource allocation can be performed), the process returns to step S128, where the next highest priority UE request in the queue is selected as the "primary request" and the process repeats. If the answer to step S144 is 'yes' (i.e., there are no UE requests waiting in the queue or all the available resources are exhausted), then the process may stop.

Figure 10:
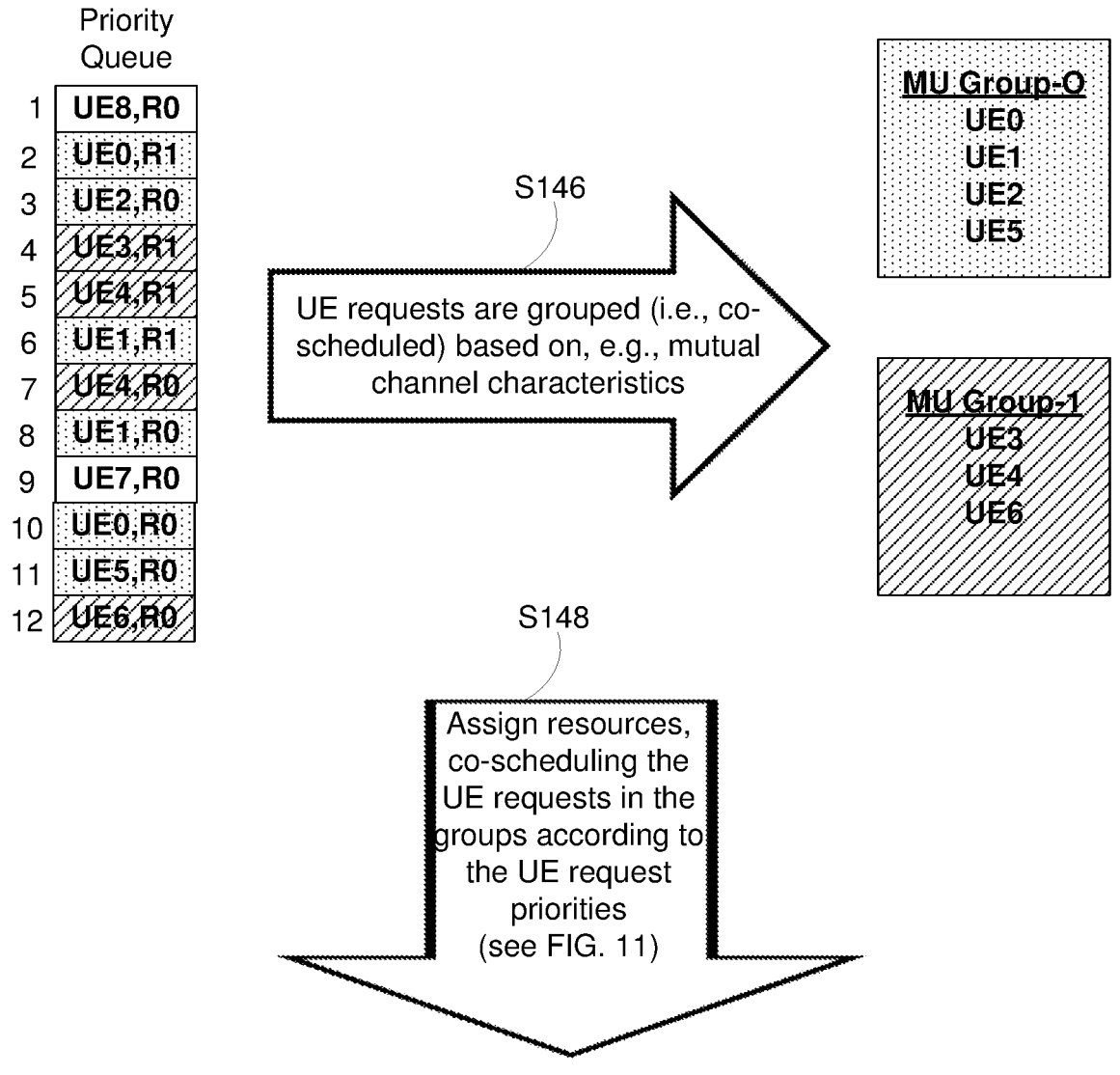
FIG. 10 is a schematic diagram of an example resource allocation using a UE request priority queue and MU-MIMO grouping according to one embodiment of the present disclosure.
Figure 11:
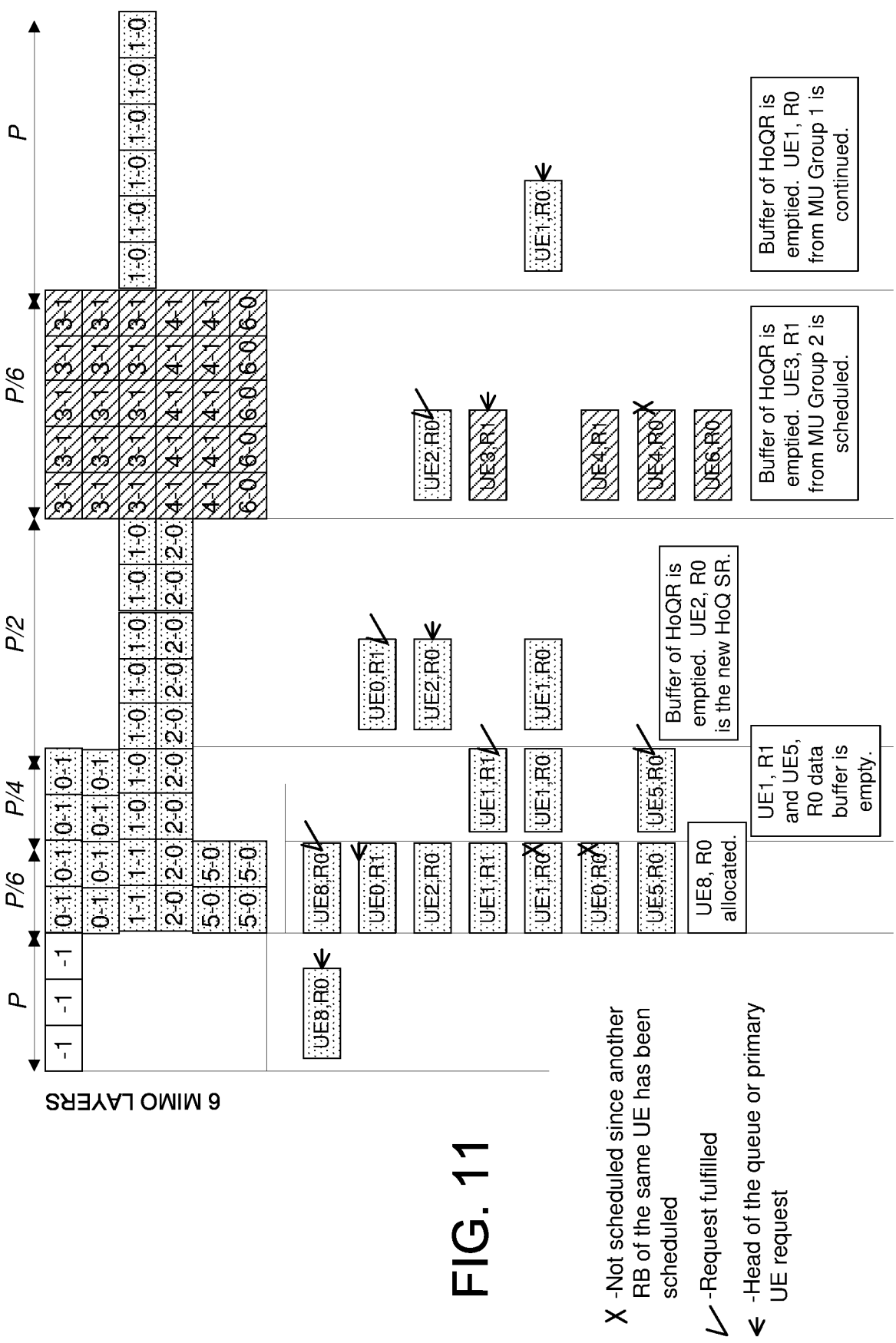
FIG. 11 is a schematic diagram illustrating an example resource allocation partitioning and dividing process using the queue and MU-MIMO grouping in FIG. 10 according to some embodiments of the present disclosure.

FIGS. 10 and 11 illustrate details of some embodiments of the present disclosure with an example, where 9 UEs 22 with varying channel qualities are competing for 22 resources. Each UE 22 has a maximum of 2 radio bearers (RBs) in this example. In FIG. 10, in the first step, step S146, the UE requests are organized into different MU groups (UE0, UE1, UE2 and UE5 are in MU GROUP 0 and UE3, UE4 and UE6 are in MU Group 1). Some of the UEs 22 may not be grouped into any of the MU groups (UE7 and UE8 are not in any of the MU groups), which are scheduled alone on allocated resources. In step S148, resources are assigned, co-scheduling the UEs 22 in the MU groups according to the user request (DRB) priorities. FIG. 10 shows the priority queue in descending order, with UE8's scheduling request R0 (notated UE8, R0) being the highest priority UE request in the queue and UE6's scheduling request R0 (notated UE6, R0) being the lowest priority UE request in the queue. FIG. 11 is a schematic diagram illustrating an allocation resource strategy using the example scenario priority queue and grouping arrangement introduced in FIG. 10.

As shown in FIG. 11, the first three resources (labelled −1, −1, −1) are allocated to UE8 R0, i.e., request for radio bearer (RB) 0 of UE8, which is the highest priority RB and, as discussed above with reference to FIG. 10, UE8 cannot share a resource with other UE requests in the queue. Thus, as shown in FIG. 11, all of the available transmit power, P, is used by the single transmission layer for the UE8 R0 request.

When UE8 R0 is fulfilled, the next available resources, i.e., from the fourth resource onwards are allocated to the next highest priority request in the queue, UE0 R1 (see the FIG. 10 queue where the $2^{nd}$ highest priority is for the UE0 R1 request). In addition to the UE0 R1 request, the available resource may be shared with other co-schedulable UE requests. UE0 is in MU Group 0 along with UE1, UE2 and UE5. Thus, UE requests from UE1, UE2 and UE5 may be co-scheduled with UE0 R1. As depicted, although UE1 R0 and UE0 R0 are part of the same MU Group 0, they are not co-scheduled since there are already UE requests from UE1 and UE0 being processed in the resource. When UE1 R1 is fulfilled after two resources have been scheduled, UE1 R0 is then considered for co-scheduling with the highest priority UE request, UE0 R1.

UE0 and UE5 can transmit two layers (as shown in FIG. 11, resources 0-1 and 5-0 are illustrated as corresponding to two layers) based e.g., on the channel quality for UE0 and UE5. The available transmit power, P, for a resource is equally divided across all the transmission layers. For example, P/6 indicates that the available transmit power is divided equally per each of the 6 transmission layers that is scheduled to be transmitted over the resource; while P/4 indicates that the available transmit power is divided equally per each of the 4 transmission layers that is scheduled to be transmitted over the particular resource.

When the UE0 R1 request ($2^{nd}$ highest priority) is fulfilled, the next available resources are then allocated to the next highest priority UE request in the queue ($3^{rd}$ highest priority), which in this case is UE2 R0. Since UE2 is still part of the same MU Group 0, the same UEs 22 (UE0, UE1, UE2 and UE5) can be co-scheduled on the available resources.

When the UE2 R0 request is fulfilled, the next available resources are then allocated to yet the next highest priority request in the queue ($4^{th}$ highest priority), which in this case is UE3 R1. In addition to the UE3 R1 request, the available resource may be shared with other co-schedulable UE requests. However, UE3 is in MU Group 1, along with UE4 and UE6. Thus, UE requests from UE4 and UE6 may be co-scheduled with the UE3 R1 request, as shown in FIG. 11.

UE1 R0 still had more data in the buffer, i.e., needed more resources when the primary request from UE2 R0 is fulfilled. However, the subsequent resources after the UE2 R0 is fulfilled cannot be allocated to UE1 R0, since the next highest priority radio bearer is UE3 R1, which is not part of UE1's MU group. Thus, the UE1 R0 request waits for the next scheduling or co-scheduling opportunity.

The allocation map is shown in FIG. 11 and assumes that all the pairable UE requests are always paired. However, although there are UE requests which can be paired, in some embodiments, only a subset of them may be paired. For example, if a resource is allocated to many UE requests expected to result in overall data rate and/or user fairness on the resource to degrade, the resource is allocated to only selected UE requests. As evident from FIG. 11, allocating to more layers results in less transmit power per each individual layer, which may cause degraded signal-to-interference-plus-noise ratio (SINR) for each layer.

In some embodiments, the available transmit power per each resource may also be unequally distributed among the co-scheduled UE requests based on the UE request's need and/or priority.

One or more of the following abbreviations may be used in the present disclosure:

Abbreviation Explanation

AAS Adaptive Antenna Systems
CRS Cell-specific Reference Signal
CSI-RS Channel Status Indicator—Reference Signal
DBF Digital BeamForming
DL Down-Link
HO Hand-Over
LTE-A Long Term Evolution—Advanced
NR New Radio PDSCH Physical Downlink Shared Channel PRB Physical Resource Block RSRP Reference Signal Receive Power RSRQ Reference Signal Receive Quality RSSI Reference Signal Strength Indicator UE User Equipment As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as JAVA® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node, the method comprising:

selecting an available resource in a transmission time interval, TTI;

determining at least one set of dedicated radio bearers, DRBs, that can be co-scheduled in the selected resource; and allocating the selected resource to at least a subset of the determined at least one set of DRBs;

wherein allocating the selected resource to the at least the subset of the at least one set of DRBs comprises:

selecting a highest priority DRB having data to transmit in the TTI;

determining at least one set of dedicated radio bearer, DRBs, that can be co-scheduled with the highest priority DRB;

partitioning the resource among the highest priority DRB and at least one DRB of the at least one set of DRBs that can be co-scheduled with the highest priority DRB; and allocating at least a first part of the selected resource to the highest priority DRB;

wherein the partitioning the resource among the highest priority DRB and the at least one DRB of the at least one set of DRBs comprises:

dividing an available transmit power for the resource among the highest priority DRB and the at least one DRB of the set of DRBs;

wherein the dividing the available transmit power for the resource among the highest priority DRB and the at least one DRB of the at least one set of DRBs comprises:

computing a total number of transmission layers scheduled on the selected resource; and allocating equal transmit power per each transmission layer that is scheduled to be transmitted over the resource.

2. The method of claim 1, wherein allocating the selected resource to the at least the subset of the at least one set of DRBs comprises:

selecting a highest priority DRB having data to transmit in the TTI; and allocating at least a first part of the selected resource to the highest priority DRB.

3. The method of claim 1, wherein the partitioning the resource among the highest priority DRB and the at least one DRB of the at least one set of DRBs comprises:

dividing at least one of time, frequency and power reserved for the resource among the highest priority DRB and the at least one DRB of the at least one set of DRBs.

4. The method of claim 2, wherein:

determining the at least one set of DRBs that can be co-scheduled in the selected resource comprises:

determining the at least one set of DRBs that can be co-scheduled with the highest priority DRB in the TTI; and allocating the selected resource to the at least the subset of the at least one set of DRBs comprises:

allocating at least a second part of the selected resource to at least one DRB in the at least the subset of DRBs that can be co-scheduled with the highest priority DRB in the TTI.

5. The method of claim 2, wherein selecting the highest priority DRB having data to transmit in the TTI comprises:

sorting a plurality of DRBs that have data in a buffer for the TTI in a queue of DRBs according to a priority order; and selecting the highest priority DRB in the queue.

6. The method of claim 2, wherein selecting the available resource in the TTI comprises:

selecting the available resource in the TTI for allocation to the highest priority DRB.

7. The method of claim 6, wherein selecting the available resource in the TTI for the highest priority DRB comprises:

identifying an available resource having a highest channel quality out of a plurality of available resources for allocation to the highest priority DRB.

8. The method of claim 1, wherein determining the at least one set of DRBs that can be co-scheduled with the highest priority DRB in the TTI comprises: identifying a plurality of DRBs having data to transmit in the TTI; and evaluating a sum utility metric among the identified plurality of DRBs and the highest priority DRB.

9. The method of claim 4, wherein allocating the selected resource to the at least the subset of the at least one set of DRBs and the highest priority DRB comprises:

selecting the at least the subset of the at least one set of DRBs based on a maximum sum utility; and allocating the selected resource to all DRBs in the selected at least the subset and the highest priority DRB.

10. The method of claim 1, wherein determining the at least one set of dedicated radio bearer, DRBs, that can be co-scheduled in the selected resource further comprises:

grouping a plurality of DRBs that have data in a buffer for the TTI into multi-user multiple-input multiple-output, MU-MIMO, groups based at least in part on a spatial separation of user equipments, UEs (22), associated with each DRB of the plurality of DRBs.

11. The method of claim 1, further comprising: if the allocation of the selected highest priority DRB is fulfilled in the TTI, selecting a next highest priority DRB having data to transmit in the TTI; and allocating at least a third part of the selected resource to the next highest priority DRB.

12. The method of claim 11, further comprising:

as a result of selecting the next highest priority DRB, determining a set of DRBs that can be co-scheduled with the next highest priority DRB in the TTI; and allocating the at least the third part of the selected resource to the next highest priority DRB and at least a subset of the determined set of DRBs that can be co-scheduled with the next highest priority DRB in the TTI.

13. The method of claim 12, further comprising:

discontinuing allocating the selected resource to the at least one set of DRBs that can be co-scheduled with the highest priority DRB that is fulfilled in the TTI.

14. A network node comprising processing circuitry, the processing circuitry configured to:

select an available resource in a transmission time interval, TTI;

determine at least one set of dedicated radio bearer, DRBs, that can be co-scheduled in the selected resource; and allocate the selected resource to at least a subset of the determined at least one set of DRBs;

wherein allocating the selected resource to the at least the subset of the at least one set of DRBs comprises:

selecting a highest priority DRB having data to transmit in the TTI;

determining at least one set of dedicated radio bearer, DRBs, that can be co-scheduled with the highest priority DRB;

partitioning the resource among the highest priority DRB and at least one DRB of the at least one set of DRBs that can be co-scheduled with the highest priority DRB; and allocating at least a first part of the selected resource to the highest priority DRB;

wherein the partitioning the resource among the highest priority DRB and the at least one DRB of the at least one set of DRBs comprises:

dividing an available transmit power for the resource among the highest priority DRB and the at least one DRB of the set of DRBs;

wherein the dividing the available transmit power for the resource among the highest priority DRB and the at least one DRB of the at least one set of DRBs comprises:

computing a total number of transmission layers scheduled on the selected resource; and computing a transmit power share per each transmission layer that is scheduled to be transmitted over the resource according to each transmission layer's user priority.

15. The network node of claim 14, wherein the processing circuitry is configured to allocate the selected resource to the at least the subset of the at least one set of DRBs by being configured to:

select a highest priority DRB having data to transmit in the TTI; and allocate at least a first part of the selected resource to the highest priority DRB.

* * * * *